United States Patent [19]
Gross et al.

[11] Patent Number: 5,063,112
[45] Date of Patent: Nov. 5, 1991

[54] IMPACT-RESISTANT METHACRYLATE PROTECTIVE LAYER FOR POLYCARBONATE, CONTAINING UV ABSORBER

[75] Inventors: Heinz Gross, Mühltahl; Jens-Dieter Fischer, Darmstadt; Werner Siol, Darmstadt-Eberstadt; Thomas Süfke, Rossdorf; Thomas Rhein, Stadecken-Elsheim, all of Fed. Rep. of Germany

[73] Assignee: Rohm GmbH Chemische Fabrik, Darmstadt, Fed. Rep. of Germany

[21] Appl. No.: 432,388

[22] Filed: Nov. 6, 1989

[30] Foreign Application Priority Data

Nov. 5, 1988 [DE] Fed. Rep. of Germany ....... 3837588

[51] Int. Cl.$^5$ .................. B32B 27/36; B32B 27/08; C08L 69/00
[52] U.S. Cl. .................. 428/412; 428/520; 428/522; 525/148; 264/176.1; 427/160
[58] Field of Search .......... 428/412, 522, 520; 427/160; 525/148

[56] References Cited
U.S. PATENT DOCUMENTS 3,582,398  6/1971  Ringler .
4,576,870  3/1986  Liebler et al. .
4,666,779  5/1987  Curry .
4,707,393  11/1987  Vetter et al. .
4,749,749  6/1988  Munzer et al. .

FOREIGN PATENT DOCUMENTS 110221  6/1984  European Pat. Off. .
203487  12/1986  European Pat. Off. .
1694273  8/1971  Fed. Rep. of Germany .
832676  2/1980  Fed. Rep. of Germany .
3719239  12/1988  Fed. Rep. of Germany .
3743199  6/1989  Fed. Rep. of Germany .
3803405  8/1989  Fed. Rep. of Germany .
2028228  3/1980  United Kingdom .

OTHER PUBLICATIONS

R. Gaechter and Dr. H. Mueller, *Taschenbuch der Kunststoff-Additive*, pp. 96–111, Carl Hanser Verlag (1979).

*Primary Examiner*—P. C. Sluby
*Attorney, Agent, or Firm*—Oblon, Spivak, McClelland, Maier & Neustadt

[57] ABSTRACT

Multi-layer plastic elements containing a polycarbonate core, with a polymethacrylate layer containing a UV absorber, and modified to be impact-resistant, applied to the core, where the polymethacrylate plastic layer is composed of methacrylate copolymers, which form compatible mixtures with polycarbonate, especially the polycarbonate of bisphenol A, exhibit good adhesion between the polycarbonate and the polymethacrylate. The methacrylate copolymers are methyl methacrylate copolymers with (meth)acrylic monomers which contain carbocyclic substituents in the ester group. The protective layer containing UV absorber is applied to the polycarbonate plastic in thickness from 1 to 500 μm by coextrusion or by lacquering.

4 Claims, 1 Drawing Sheet

IMPACT-RESISTANT METHACRYLATE PROTECTIVE LAYER FOR POLYCARBONATE, CONTAINING UV ABSORBER

BACKGROUND OF THE INVENTION

1. Field of the Invention

The present invention relates to multi-layered plastic molded parts which predominantly contain of aromatic polycarbonate, and which are provided with a layer of polymethacrylate plastic which contains a UV absorber at the surface, as protection against the effect of UV radiation, and a process for producing such plastic molded parts.

2. Discussion of the Background

Polycarbonate plastics have only limited weather-resistance. They are damaged by UV radiation, in particular, this damage being expressed by the fact that surfaces which were originally shiny become matte. The matte appearance is the visible manifestation of the macromolecular decomposition caused by the UV radiation, due to which a large number of extremely fine hairline cracks are formed, starting at the surface of the plastic. UV absorbers incorporated into the plastic are able to protect the interior of the plastic element, such as a plastic panel made of polycarbonate, but they cannot protect the surface. To protect the surface, a lacquer layer of polymethyl methacrylate, which also contains a UV absorber, is prepared from a solution of these protective layer components, according to U.S. Pat. No. 3,582,398.

U.S. Pat. No. 4,666,779 also describes UV-stabilized articles of thermoplastic substrates, especially those of polycarbonates which are protected by a protective layer which essentially consists of methyl methacrylate units and from 0.5 to about 10% of the number of monomer units of other methacrylate units, specifically ethyl methacrylate, n-butyl methacrylate, iso-butyl methacrylate or mixtures of these, and from 0 to 5% of the number of monomer units of other $\alpha,\beta$-unsaturated monomer units. The polymethacrylate protective layer is applied to the substrate as a solution, with the UV stabilizers having a low molecular weight, which are required for UV stabilization, being applied with the polymer-solvent system.

In addition, plastic elements are also disclosed in U.S. Pat. No. 4,576,870 and EP-A 0 203 487, in which the UV-absorbing protective layer is a copolymer essentially of (meth)acrylester monomers and monomers which contain UV protection groups. These protective layers are generally even more brittle than the protective layers which contain UV absorber and have a low molecular weight, as described above.

According to DE-A 28 32 676, a polymethyl methacrylate layer with a sufficient content of UV absorber is applied by coextrusion during production of a polycarbonate plastic panel. According to DE-A 32 44 953, which corresponds to EP-A 110 238, an improved laminate element is obtained by the fact that on top of the plastic layer which contains UV absorber, which can be polymethyl methacrylate or polycarbonate, an additional cover layer of polymethyl methacrylate or (meth)acrylate polymers, essentially containing less UV absorber, is applied during the multiple-material extrusion process.

In all cases described above, polymethacrylate plastics, particularly polymethyl methacrylate, or copolymers of methyl methacrylate and subordinate amounts of $C_2$ to $C_{10}$ alkyl or aryl (meth)acrylates esters, are used as the cover layer which contains containing UV protection, because they are highly weather-resistance and their surfaces are less easily damaged by UV radiation than those of polycarbonates—EP-B 110 221 describes polycarbonate cover layers which contain UV absorber.

The disadvantage of the known polymethacrylate cover layers for polycarbonate plastics, which contain UV absorber, is that they adhere insufficiently to the polycarbonate to be covered, and that they exhibit a lower impact resistance, in comparison with polycarbonates. These poor properties especially have a detrimental effect on the entire plastic laminate during further mechanical processing of the multi-layer plastic molded elements, such as when they are bent.

SUMMARY OF THE INVENTION

Accordingly, it is an object of the present invention to provide multi-layered plastic molded parts which contain a predominantly polycarbonate core and a polymethacrylate layer, applied directly to the polycarbonate core and containing a UV absorber, which permanently adheres to the core containing polycarbonate which is to be protected, in order to overcome the deterioration of the mechanical properties of the entire element, which was previously caused by the polymethyl methacrylate layer, such as deterioration of the bending strength or breaking strength.

It is another object of the present invention to provide a process for preparing such a multi-layered plastic element.

These and other objects, which will become apparent in the course of the following detailed description, have been achieved by the inventors' discovery that the above-described disadvantages of the previously known cover layers are avoided, but that their protective effect is fully retained, if the multi-layer plastic elements based on polycarbonate are structured in such a way that a polymethacrylate layer containing a UV absorber is applied to the polycarbonate material to be protected, this layer being a polymethacrylate plastic with modified impact resistance, whose one phase consists of methacrylate polymers which in themselves form compatible mixtures with polycarbonate, as does the impact-strength modified polymethacrylate plastic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
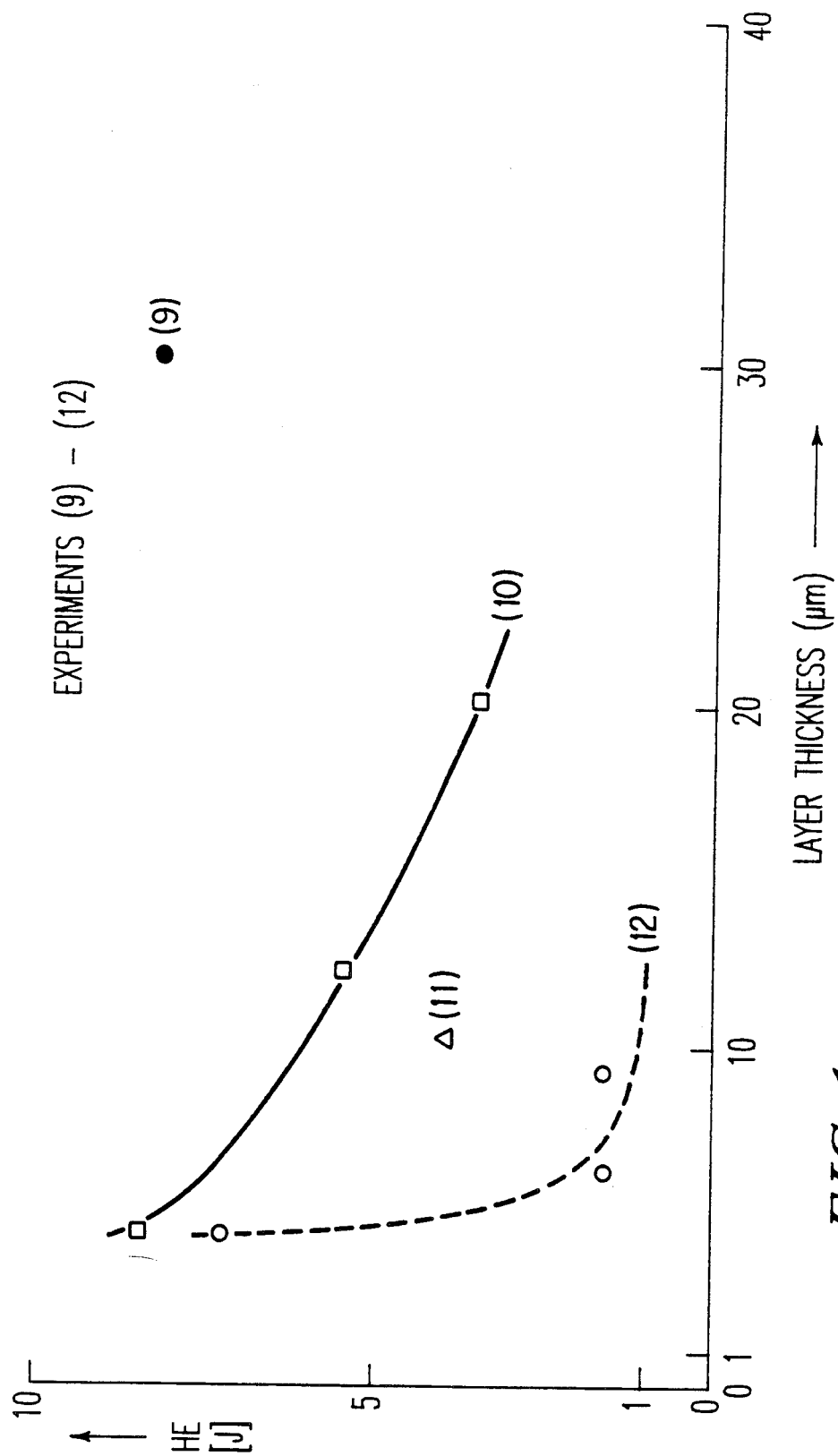
FIG. 1 illustrates the results of the hail impact resistance as a function of the layer thickness of coextruded or lacquered methacrylate UV protection layers on PC-SDP.

Thus, one aspect of the present invention is a multi-layered plastic element with a core layer of more than 50 wt. % aromatic polycarbonate and a thermoplastic polymethacrylate plastic layer which contains a UV absorber and whose impact strength has been modified applied to the core, which can also be covered with additional layers, characterized by the fact that the polymethacrylate plastic layer is a two-phase mixed polymer, which contains UV absorber or UV-absorbing groups in amounts of 0.01 to 50% by weight, and that the two-phase mixed polymer consists of (A) 10 to 90% by weight of polymers, P, which can be cross-linked if necessary, with a glass temperature $Tg \leq 10°$ C., preferably $Tg \leq -10°$ C., into which 0 to 30% by weight, based on the amount of P, of a polymerizable UV absorber can be incorporated; and (B) 90 to 10% by weight of a methyl methacrylate copolymer which is at least partially covalently linked with (A), with a glass temperature $Tg \geq 30°$ C., comprising:
  (i) 99.9 to 5 wt. %, preferably 95 to 20% by weight, of methyl methacrylate units and, if necessary, additional α,β-unsaturated monomer units in amounts of 0 to 40% by weight;
  (ii) 0 to 50% by weight of a polymerizable UV absorber; and
  (iii) of 0.1 to 95% by weight, preferably 5 to 80% by weight, of acrylate and/or methacrylate units having formula (I)

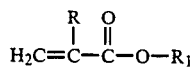

wherein R is H or CH$_3$, and R$_1$ is Y or A-Y, where Y is substituted or unsubstituted C$_{5-12}$ cycloalkyl or C$_{6-12}$ aryl, possibly alkyl-substituted or oxyalkyl-substituted; and A is a C$_{1-6}$ alkylene group, which may also be branched, or a C$_{2-4}$ an oxyalkylene group, where the copolymer (B) in itself would have a molecular weight $M_w \geq 30,000$ and the aromatic polycarbonate (PC) and the copolymerizate (B) are compatible at all ratios, and this mixture has a lower critical solution temperature (LCST) of $\geq 120°$ C.

The present invention further relates to a process for the production of a multi-layer plastic element with a core layer of more than 50% by weight aromatic polycarbonate and a thermoplastic polymethacrylate plastic layer which contains a UV absorber applied to the core, which can also be covered with additional layers, by applying a thermoplastic polymethacrylate plastic layer which contains a UV absorber and is a polymethacrylate copolymer whose impact strength has been modified and which is compatible with a polycarbonate, by coextrusion or lacquering, to the core layer in layer thicknesses from 1 to 500 μm.

The additives which provide UV protection can be added to the two-phase mixed polymer (A)-(B) as known, soluble compounds which absorb UV and have a low molecular weight, before it is applied to the polycarbonate plastic, or polymerizable compounds which contain UV-absorbing structures in the molecule, that is the so-called and known polymerizable UV absorbers, are polymerized during the production of (A) and/or (B). The polymethacrylate plastic layer may also contain both UV absorber species as UV protection. (See, e.g., R. Gachter and H. Müller, *Taschenbuch der Kunststoff-Additive* p. 96–111, Carl Hanser Verlag, 1979).

The polymethacrylate layer according to the present invention, which absorbs UV, is impact-resistant and adheres well to the polycarbonate plastic, is applied to the plastic to be protected, which consists predominantly of aromatic polycarbonate, preferably the carbonate of bisphenol A, according to the invention, using conventional methods, such as coextrusion and lacquering. If necessary, the polymethacrylate layer can be coated with another cover layer, e.g. a weather-resistant polymethyl methacrylate layer, with this layer being applied simultaneously with the other layers, during coextrusion, or being applied by subsequent lacquering, such as e.g. a scratch-resistant coating based on silicon resins or cross-linked polyacrylates.

The methacrylate copolymers (B) can in themselves be thermoplastically processed to yield glass-clear, colorless masses. Methacrylate copolymers (B) of (i) and (iii) which are compatible with aromatic polycarbonate are described in the German Patent Application P 37 19 239.6.

Examples of such acrylic and methacrylic ester comonomers of Formula I—i.e. with carbocyclic groups in the ester remainder—are cyclopentyl methacrylate, cyclohexyl acrylate, cyclohexyl methacrylate, 3,3,5-trimethyl cyclohexyl methacrylate, 4-t-butyl cyclohexyl acrylate, 4-t-butyl cyclohexyl methacrylate, 3-cyclohexyl propyl methacrylate, phenyl methacrylate, 4-t-butyl phenyl methacrylate, 4-methoxyphenyl methacrylate, benzyl methacrylate, 1-phenylethyl methacrylate, 2-phenylethyl acrylate, 2-phenylethyl methacrylate, 3-phenylpropyl acrylate, 3-phenylpropyl methacrylate, 2-phenoxyethyl methacrylate, 2-naphthyl methacrylate.

Acrylic or methacrylic amides which are comonomers which can also be compatible with polymethacrylate resin, according to DE-A 36 32 946 (corresponds to U.S. Pat. No. 4,749,749), can be polymerized into (B). Such monomers include, for example, N-cyclohexyl acrylamide, N-cyclohexyl methacrylamide, N-2-methylcyclohexyl methacrylamide, N-phenyl methacrylamide, N-benzyl methacrylamide.

The methacrylate copolymers described in the above-mentioned patents result in fully compatible mixtures with aromatic polycarbonate, especially the polycarbonate of bisphenol A, described there, which are distinguished by high transparency.

Maleimide comonomers with N-carbocyclic substituents, such as N-cyclohexyl maleimide, N-2- or N-4-methylcyclohexyl maleimide, N-3,3,5-trimethylcyclohexyl maleimide, N-4-ethylcyclohexyl maleimide, N-2-phenylcyclohexyl maleimide, impart compatibility with aromatic polycarbonates to methyl methacrylate polymers, according to German Patent Application DE 37 09 562.5.

The core layer of plastic element according to the invention consists predominantly of the aromatic polycarbonate to be protected from UV light. Polycarbonates of bisphenol A are particularly preferred technically as aromatic polycarbonates. Polycarbonates of bisphenol A are glass-clear, impact-resistant plastics and are commercially available under the trade name Makrolon ®, for example. The molecular weights $M_w$ of the carbonate polymers on which these plastics are based, in g per mole, as determined by gel permeation chromatography or by light scattering, are in the range of about 20,000 to 60,000, preferably 20,000 to 40,000, and the Vicat softening temperatures (VST) of these polymers, measured according to DIN 53460, lie between 140° C. to 160° C.

The polycarbonate plastic can be used for production of the plastic elements according to the invention in pre-finished form, for example in the form of solid plates, in the form of hollow chamber plates, in the form of domes or in the form of practically any structure that can be thought of, with the protective coating preferably being applied as a lacquering, in this case. For the molded parts according to the invention to be produced by coextrusion, the polycarbonates and the methacrylate layer of (A) and (B) to be applied to for their protection can be present in the usual form and quality suitable for extrusion, for example granulates or powders.

For the production of the plastic elements according to the invention, compatible polymer mixtures which predominantly consist of aromatic polycarbonate, preferably the polycarbonate of bisphenol A, i.e., 99.9 to 80% by weight, can also be advantageously used as polycarbonate plastics, and their alloy components, i.e. in amounts of 0.1 to 20% by weight, can consist of one or more methacrylate copolymers (B) and/or the two-phase mixed polymer of (A) and (B), which are fully compatible with the aromatic polycarbonate, as was already explained above.

The two-phase mixed polymer of (A) and (B) guarantees permanent UV protection of the polycarbonate plastic, due to its structure and because of the UV absorbers contained in the copolymer layer, even under or after severe mechanical stress. It is an impact-resistant, transparent material, compatible with the polycarbonate plastic, as it is essentially described in the German Patent Applications P 37 43 199.4 and P 38 03 405.0.

For the production of the UV protective layers according to the invention, which are made to be impact-resistant, polymers P with a glass temperature of $Tg \leq 10°$ C., preferably $> -10°$ C., are used as the viscous phase (A); this includes polymers which are generally classified under the term of rubber. The polymers of component (A) might be cross-linked. Their glass temperature, Tg, determination can be carried out according to Edith A. Turi, "Thermal Characterization of Polymeric Materials", p. 169 ff., Academic Press, New York, 1981.

As polymers P for the viscous phase (A), polymers are preferably selected from the group consisting of polyolefins, polydienes, ethylene/vinyl acetate copolymers, polyacrylates, polysiloxanes (see in this regard Ullmann's Encyclopädie der technischen Chemie, 4th edition, Volume 13, pages 595 to 635, Verlag Chemie 1977). Methods for production of these rubbers with their properties, such as solubility and viscosity, as well as their molecular weights $M_w$, are indicated in this reference.

Terpolymers of ethylene, propylene and a diene, so-called EDPM types, are preferred as the viscous phase (A), and acrylate rubbers, particularly those based on butyl acrylate, are particularly preferred. These polyacrylates are preferably produced by polymerization in aqueous emulsion, partially also in suspension, according to pertinent conventional methods (see: Ullmann's Encyclopädie der technischen Chemie, 4th edition, Volume 19, pages 125 to 137, Verlag Chemie 1980). For production of the methyl methacrylate copolymerizate (B) combined with (A), the monomers of Formula I to be incorporated into the polymer component are known. They are described, in addition to others named as comonomers for methyl methacrylate, in the German Patent Application P 37 19 239.6, which was already mentioned above. Examples of the monomers of Formula I include especially phenyl methacrylate, benzyl methacrylate, phenylethyl methacrylate, phenylethyl acrylate, cyclohexyl methacrylate. In a preferred embodiment, R is $CH_3$, i.e. the monomers I are preferably derived from methacrylic acid.

The two-phase mixed polymer (A)–(B) consists of polymers P in amounts of 10 to 90% by weight, preferably in amounts of 10 to 60% by weight, and particularly preferably in amounts of 20 to 50% by weight, and of the copolymer (B) in amounts of 90 to 10% by weight, preferably in amounts of 90 to 40% by weight, and particularly preferably in amounts of 80 to 50% by weight, this copolymer (B) being at least partially covalently linked with the polymers P which form the polymer phase (A).

The copolymer (B) contains methyl methacrylate units in the amount of 99.9 to 5% by weight, preferably 95 to 20% by weight, and particularly preferably 80 to 40% by weight, and of acrylic and/or methacrylic monomers of Formula I, in the amount of 0.1 to 95% by weight, preferably 5 to 80% by weight, and particularly preferably 20 to 50% by weight. It can contain additional $\alpha,\beta$-unsaturated compounds, such as styrene, $\alpha$-methyl styrene, acrylic acid, methacrylic acid, $C_1$ to $C_6$ esters of acrylic acid, such as methacrylate and other esters ($C_2$ to $C_6$ esters) of methacrylic acid, such as ethyl methacrylate and the acrylic and methacrylic amides which are substituted with carbocycles and were already mentioned above, polymerized in amounts of 0 to 40% by weight, preferably amounts of 0.5 to 20% by weight. The incorporation of compounds with several polymerizable double bonds, i.e. of cross-linkes, is possible and sometimes practical.

The methacrylate copolymers (B) as such are polymers with glass temperatures $Tg \geq 30°$ C., which can be thermoplastically processed in themselves to form colorless molded elements, with Vicat softening temperatures, VST, measured according to DIN 53460, of about 100° to 150° C., and which form compatible mixtures with aromatic polycarbonate.

The production of the two-phase mixed polymer (A)–(B) for the cover layer with modified impact resistance according to the invention can be carried out by conventional methods:

In general, the polymer P of phase (A) is made available, for example, in the form of a solution in a solvent suited for further processing, for example, in a solvent suited for radical polymerization of the monomers of (B) (H. Rauch-Puntigam, Th. Völker, "Acryl-und Methacrylverbindungen", pages 230 to 234, Springer-Verlag, Heidelberg, 1967; J. Brandrup, E. H. Immergut, Polymer Handbook, III-144 to III-148, John Wiley, 1975). In this connection, the tendency of the solvents towards transfer reactions should be taken into consideration, among other things. Suitable solvents to be mentioned are, for example, esters such as butyl acetate, ethyl acetate, hydrocarbons such as toluene and ketones such as acetone. In general, solutions with a content of about 15 to 50% by weight of the polymer P are the basis, with monomers and polymerization aids being added by pouring, for example. Polymerization is generally carried out at an elevated temperature, for example in the range of 80° to 140° C. Conventional initiators, such as peroxides or azo compounds, can be used (cf. H. Rauch-Puntigam, Th. Völker, Acryl- und Methylverbindungen, loc. cit.).

In case of solvents with a low boiling point, dibenzoyl peroxide can be used, for example, while tert-butyl compounds, such as tert-butyl peroctoate, are useful for solvents with a higher boiling point.

In case of EPDM grafting, polymerization of the monomers to form component (B) can first be carried out at approximately 120° C., using butyl acetate as the solvent, and subsequently, it can be completed at approximately 80° C., adding additional methyl methacrylate, cross-linkers and initiators. It is practical to carry out the polymerization in the presence of regulators, e.g. mercaptan.

The two-phase mixed polymer (A)-(B) is preferably produced as an emulsion polymer in an aqueous medium, with polybutyl acrylate or a phase essentially consisting of polybutyl acrylate being produced as phase (A), with this being the core onto which one or several layers of (B) are applied, by polymerization according to the conventional methods of emulsion polymerization (loc. cit. Ullmann, Volume 13 and Ullmann, Volume 19). The viscous phase (A) can also be polymerized onto a hard primary particle, for example a polymethyl methacrylate particle, at first. This is also a way to produce useful mixed polymers (A)-(B) with more than one layer. Emulsion polymerization of the individual layers is consecutively carried out at temperatures of about 30° to 100° C. in the presence of water-soluble polymerization initiators, such as potassium persulfate or redox systems with metal ions of varying valence, for example $Fe^{II}/Fe^{III}$. Dispersions with particle sizes (radii) of the solid between 10 and 300 nm can be produced. Dispersions whose particles have radii from 20 to 100 nm are preferred.

Advantageously, the two-phase or multi-phase mixed polymer is obtained from the solution by precipitation, for example using methanol as the precipitant. When the polymerizate is produced by emulsion polymerization, it is obtained by freezing coagulation, or by spray-drying or advantageously by squeezing the emulsion polymerizate dry using an extruder.

The UV absorbers are present in the polymethacrylate layer in amounts from 0.01 to 50% by weight, preferably in amounts of 0.1 to 30% by weight, and particularly preferably in amounts of 1 to 20% by weight. The UV absorbers can be distributed homogeneously, i.e. dissolved, in the polymethacrylate layer (A)-(B) as substances with a low molecular weight, i.e. with molecular weights $M_w \leq 5000$, and/or the polymer phases (A) and/or (B) may contain UV-absorbing residues by incorporation of copolymerizable compounds, i.e., the known polymerizable UV absorbers, as described in U.S. Pat. No. 4,576,870, for example. As examples of polymerizable UV absorbers, 2-(2'-hydroxyphenyl)-5-methacryloylamido-benzotriazole or 2-hydroxy-4-methacryloxybenzophenone can be mentioned. (Cf. Houben-Weyl, 4th Edition, Vol. 15, pp. 256-260, Verlag Chemie).

The polymerizable compounds can, however, also be advantageously used in their monomer form, as soluble UV absorbers with a low molecular weight, in the polymethacrylate layer (A)-(B). Additional UV absorbers with a moleoular weight $M_w \leq 5000$ are 2-hydroxy-4-n-octoxybenzophenone, 2-hydroxy-4methoxybenzophenone, 2-(2'-hydroxy-5'-methylphenyl)benzotriazol and other derivatives of 2-hydroxybenzophenone or benzotriazol, also 2,4-dihydroxybenzoyl furan, salicyclic acid phenyl ester, resorcinol disalicylate, resorcinol monobenzoate and dibenzoate, benzyl benzoate, stilbene, β-methyl umbelliferone and its benzoate. Numerous other UV absorbers are known and commercially available. UV absorbers with low volatility at the processing temperature, i.e. especially those with the highest possible molecular weight, are especially preferred. The UV absorber is to be distributed as homogeneously as possible at the concentration selected in the polymethacrylate layer. The core layer containing polycarbonate can be completely free of UV absorbers, or contain them in a lower concentration than the cover layer. A concentration of 0.5% by weight of UV absorber in the polycarbonate layer is not exceeded.

Homogeneously miscible UV absorbers with molecular weights $\leq 5000$ and with low volatility which are suitable are also those which contain several residues, even those with different chemical construction, which absorb UV, in their molecular structure. Such oligomers can be obtained according to known polycondensation reactions of multi-functional starting compounds, or by polymerization reactions of known polymerizable UV absorbers (see for example U.S. Pat. No. 4,576,870), also by copolymerization of other common comonomers. By adjusting suitable condensation conditions and polymerization conditions (e.g. starting amount, transfer regulator amount), molecular weights $\leq 5000$ can be adjusted.

The cover layer (A)-(B) which contains a UV absorber is applied by coextrusion or lacquering, in layer thicknesses of from 1 to 500 μm, preferably 1 to 100 μm, particularly preferably in layer thicknesses up to about 50 μm, according to conventional techniques. For the extrusion technique, known multi-material slit dies are used. Extrusion takes place at temperatures between 240° and 300° C. For lacquering, solvents in which the system (A)-(B) is soluble or can swell are used. For example, 1-methoxypropanol-2 can be used for this.

The methacrylate copolymers (A)-(B) which are excellent as protective layers for polycarbonate plastic according to the invention, because of their good adhesion and their impact resistance, form compatible (miscible) mixtures with the polycarbonate of bisphenol A, as described in German Patent Application P 38 03 405.0 by the criteria according to the "Transition Temperature Method" and according to the "Optical Method", as required for compatible (miscible) polymer mixtures and described in the chapter "Compatible Polymers" in Polymer Handbook, Second Edition, Copyright © 1975, by John Wiley & Sons, III, 211. These compatible mixtures can furthermore be characterized by their LCST behavior (D. R. Paul, Polymer Blends and Mixtures, 1985, pp. 1-3; Martinus Nijhoff Publishers, Dordrecht, Boston Lancaster; Kirk-Othmer, 3rd edition, Volume 18, pp. 443-478, J. Wiley 1982), in such a way that they have a lower critical solution temperature (LCST) of $\geq 120°$ C., especially $\geq 150°$ C. Experimentally, the clouding point $T_{Tr}$ (clouding temperature) is determined for this purpose, for example on a Kofler heating plate (Chem. Ing.-Technik 1950, p. 289), which characterizes the phase transition of the mixture from homogeneous to heterogeneous, as a function of the qualitative and quantitative composition of the mixture.

The multi-layered plastic elements based on polycarbonate according to the invention particularly find their application outdoors, e.g. as glazing and construction elements, where they are exposed to sunlight and the prevailing weather conditions. Weather tests, such as the Xeno test or the QUV test (DIN 53 387) and the hail shot test, show the clear superiority of the new materials as compared with comparison materials according to the previous state of the art. The hail shot test serves to test materials for their hail impact resistance, since severe damage due to hail impact often occurs with the use of materials which are not sufficiently resistant to hail, for example in greenhouse construction. As a result of the present invention, damage to the plastic caused by UV radiation is avoided, and other destructive effects, such as hail, also do not cause damage any longer.

Other features of the invention will become apparent in the course of the following descriptions of exemplary embodiments which are given for illustration of the invention and are not intended to be limiting thereof.

EXAMPLES

The hail impact test is a test in which polyamide balls of different size and different kinetic energy are shot at plates. The hail impact energy values (HE) indicated for the experiments indicate the energy in joules (J) at which the laminate of protective layer/substrate breaks.

Other measurement values for characterization of the surface, and therefore to demonstrate the advantages according to the invention, are determination of the surface roughness with a perthometer according to DIN 4768, determination of surface gloss, the reflectometer value according to DIN 67530, the yellow value according to DIN 6167, and determination of the layer thickness of the layer containing the UV absorber, e.g. according to U.S. Pat. No. 4,477,521.

EXAMPLES 1-4

Production of the materials for the (meth)acrylate protective layers.

EXAMPLE 1

(Meth)acrylate copolymer modified to be impact-resistant, according to the invention, produced by emulsion polymerization.

770 g water (distilled), 0.5 g acetic acid (100%), 0.04 ferric sulfate, 18 g C15-paraffin sulfonate and 125 g of a monomer emulsion I are placed into a reaction container. Polymerization is started at room temperature with 0.15 g diisopropyl benzol monohydroperoxide and 1.3 g sodium hydroxymethyl sulfinate. After the temperature peak is reached, the remaining monomer emulsion I is added, which consists in total of 730 g water (distilled), 3.4 g C15-paraffin sulfonate, 772 g butyl acrylate and 23.5 g allyl methacrylate and is initiated with 1.26 g diisopropyl benzol monohydroperoxide and 0.32 g sodium hydroxymethyl sulfinate. After the reaction has ended, the dispersion obtained is heated to 90° C and subsequently, the monomer emulsion II, consisting of 2705 g water (distilled), 4.2 g C15-paraffin sulfonate, 2.2 g potassium peroxodisulfate, 709.8 g methyl methacrylate, 668.4 g phenyl methacrylate, 73.9 g 3-(2-benzotriazol)-2-hydroxy-5-tert-octyl benzyl methacrylamide, 29.6 g methacrylate and 8.9 g 2-ethylhexyl thioglycolate, is metered in over a period of 2 hours. Characterization of the dispersion:

particle diameter = 98 nm
solid content: 35% by weight

The solid is obtained by freezing coagulation, filtration and subsequent drying in a drying cabinet at 60° C.

COMPARATIVE EXAMPLE 2 (Example According to U.S. Pat. No. 4,576,870)

10 parts by weight of 3-(2-benzotriazol)-2-hydroxy-5-tert-octylbenzyl methacrylamide are dissolved in a mixture of 80 parts by weight methyl methacrylate (MMA) and 10 parts by weight phenyl methacrylate, heating to 50° C and stirring constantly. After addition of 0.05 parts by weight of tert-butyl perneodecanoate and 0.03 parts by weight of 2,2-bis-(t-butylperoxy)butane as initiators, as well as 0.3 parts by weight dodecyl mercaptan as the regulator, polymerization is carried out in a polymerization chamber for 7 h at 50° C and for 17 h at 40° C. After, polymerization, the polymer is tempered at 110° C for 12 h. The average molecular weight was determined as being $M_w = 160,000$ and the glass transition temperature at $Tg = 110°$ C.

COMPARATIVE EXAMPLE 3

A mixture of 80 parts by weight of MMA and 20 parts by weight of ethyl acrylate is mixed with 0.05 parts by weight 2,2'-azobisisobutyronitrile as well as 0.35 parts by weight dodecyl mercaptan, and polymerized at 50° C. for 12 h in a film tube. After polymerization, the polymer is tempered at 110° C. for 12 h. The average molecular weight was determined as being $M_w = 150,000$ and the glass transition temperature as $Tg = 77°$ C.

COMPARATIVE EXAMPLE 4

A polymethyl methacrylate produced as follows serves as the polymer matrix:

0.04 parts by weight dilauryl peroxide as well as 0.62 parts by weight 2-ethylhexyl thioglycolate are added to a mixture of 94 parts by weight of MMA, 5.7 parts by weight ethyl acrylate and 0.3 parts by weight methacrylic acid. The mixture is polymerized in a film tube at 65° C. for 5 h and at 55° C. for 27 h. After polymerization, the polymerizate is tempered at 120° C. for 8 h. The average molecular weight was determined as being $M_w = 90,000$ and the glass transition temperature as $Tg = 95°$ C.

EXAMPLES 5-8

Production of the cover layers.

EXAMPLE 5 (According to the Present Invention)

The emulsion polymer produced according to Example 1 is first extruded and granulated. In the subsequent extrusion step, the granulate is applied to polycarbonate double web plates in an extrusion tool, using a multi-channel die. The thickness of the coextrusion layer is 10–30 μm.

COMPARATIVE EXAMPLE 6

The polymer produced according to Example 2 is ground, then extruded and granulated in a second compounding step. The subsequent coextrusion is carried out analogously to Example 5.

COMPARATIVE EXAMPLE 7

The polymer produced according to Example 3 is ground, then extruded and granulated in a second compounding step. 10 parts by weight (relative to the total amount) of 2-(2-hydroxy-3,5-diisopropylphenyl)benzotriazol are compounded into the granulate in a drum mixer. The subsequent coextrusion step and the thickness of the coextruded layer are as given in Example 5.

COMPARATIVE EXAMPLE 8

Lacquer coating: The exact formulation is:
  80 parts by weight 1-methoxypropan-2-ol
  14 parts by weight polymethyl methacrylate of Example 4
  6 parts by weight UV absorber Cyasorb ® 531 (2-hydroxy-4-n-octoxybenzophenone)

The lacquer formulation is applied to the polycarbonate double web plate (SDP) using a 15 μm blade, corresponding to a dry film thickness of approximately 3 μm.

EXAMPLES 9-12

Weather testing and rupture mechanics of the polycarbonate-SDP coated according to Examples 5-8.

The weather testing data (weather testing according to the Xeno test) as well as data from the hail impact test are listed as a function of the thickness of the cover layer (see also FIG. 1) for (meth)acrylate UV protective layers, in Table 1.

TABLE 1

| Example | Coextrusion layer/ lacquer layer according to | Weathering in Xeno test (+ unchanged) (h) | Hail impact energy (HE) in (J) at rupture as a function of the layer thickness, d (μm) d (μm)/He (J) |
| --- | --- | --- | --- |
| 9 | Example 5 | 1000+ | 30/8.3 |
| 10 | Comparative Example 6 | 1000+ | 4/8.5 |
|   |   |   | 12/5.5 |
|   |   |   | 20/3.5 |
| 11 | Comparative Example 7 | 5000+ | 10/4.0 (after 5 years of weather exposure) |
| 12 | Comparative Example 8 | 5000+ | 4/7.3 |
|   |   |   | 6/1.6 |
|   |   |   | 9/1.6 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United State is:

1. A multi-layer plastic element, comprising (1) a core layer of more than 50% by weight aromatic polycarbonate and (2) a thermoplastic polymethacrylate plastic layer with an impact strength which has been modified, which is in contact with said core layer, wherein said polymethacrylate plastic layer is a two-phase mixed polymer, which contains a UV absorber or UV-absorbing groups in an amount of 0.01 to 50% by weight, and said two-phase mixed polymer consists of:

(A) 10 to 90% by weight of polymer, P, with a glass temperature $Tg \leq 10°$ C., wherein said polymer P is selected from the group consisting of polyolefins, polydienes, ethylene/vinyl acetate copolymers, polyacrylates, and polysiloxanes or a mixture thereof and into which 0 to 30% by weight, based on P, of polymerizable UV absorber is incorporated; and (B) 90 to 10% by weight of a methyl methacrylate copolymer which is at least partially covalently linked with (A), with a glass temperature $Tg \geq 30°$ C., comprising:

(i) 99.9 to 5% by weight of methyl methacrylate units and 0 to 40% by weight of other $\alpha,\beta$-unsaturated monomer units;

(ii) 0 to 50% by weight of a polymerizable UV absorber; and (iii) 0.1 to 95% by weight of acrylate and/or methacrylate units having formula (I)

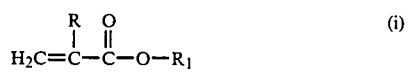

wherein R is H or $CH_3$, and $R_1$ is Y or A-Y, wherein Y is a substituted or unsubstituted $C_{5-12}$ cycloalkyl or unsubstituted alkyl-substituted, or oxyalkyl-substituted $C_{6-12}$ aryl, and A is a straight chain or branched $C_{1-6}$ alkylene group, or a $C_{2-4}$ oxyalkylene group, and where said copolymer (B) has a molecular weight $M_w \geq 30,000$ and said aromatic polycarbonate and said copolymer (B) are compatible at all ratios, and a mixture of said polycarbonate and said copolymer (B) has a lower critical solution temperature of $\geq 120°$ C.; and wherein the amount of UV absorber or UV-absorbing groups in phase (A) and (B) is in an amount of 0.01 to 50% by weight.

2. The multi-layer plastic element of claim 1 wherein said core layer is a compatible polymer mixture of 99.9 to 80% by weight of aromatic polycarbonate and 0.1 to 20% by weight of one or more of methacrylate copolymers (B) and (A)-(B).

3. The multi-layer plastic element of claim 1 wherein said polymer, P, has a glass temperature $Tg \leq -10°$ C.

4. The multi-layer plastic element of claim 1 wherein said polymer, P, is crosslinked.

* * * * *